US011248098B2

(12) United States Patent
Yun et al.

(10) Patent No.: US 11,248,098 B2
(45) Date of Patent: Feb. 15, 2022

(54) POLYIMIDE LAMINATED FILM ROLL BODY AND METHOD FOR MANUFACTURING SAME

(71) Applicant: LG CHEM, LTD., Seoul (KR)

(72) Inventors: Cheolmin Yun, Daejeon (KR); Hye Won Jeong, Daejeon (KR); Kyungjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 16/479,127

(22) PCT Filed: Mar. 16, 2018

(86) PCT No.: PCT/KR2018/003070
§ 371 (c)(1),
(2) Date: Jul. 18, 2019

(87) PCT Pub. No.: WO2018/216890
PCT Pub. Date: Nov. 29, 2018

(65) Prior Publication Data
US 2020/0040152 A1 Feb. 6, 2020

(30) Foreign Application Priority Data
May 24, 2017 (KR) .......................... 10-2017-0064367
Feb. 22, 2018 (KR) .......................... 10-2018-0020865

(51) Int. Cl.
*B32B 27/28* (2006.01)
*B32B 27/08* (2006.01)
(Continued)

(52) U.S. Cl.
CPC .............. *C08J 7/0427* (2020.01); *B32B 27/08* (2013.01); *B32B 27/281* (2013.01); *B32B 37/02* (2013.01);
(Continued)

(58) Field of Classification Search
CPC .............. B32B 27/281; B32B 2255/26; B32B 2379/08; C08G 73/1067; C08G 73/1071
See application file for complete search history.

(56) References Cited

U.S. PATENT DOCUMENTS 9,133,353 B2   9/2015 Kim et al.
2012/0016076 A1   1/2012 Kim et al.
(Continued)

FOREIGN PATENT DOCUMENTS

CN   102822238 A   12/2012
CN   103660458 A   3/2014
(Continued)

OTHER PUBLICATIONS

International Search Report issued for International Application No. PCT.KR2018/003070 dated Jul. 6, 2018, 4 pages.
(Continued)

*Primary Examiner* — Joanna Pleszczynska
(74) *Attorney, Agent, or Firm* — Rothwell, Figg, Ernst & Manbeck, P.C.

(57) ABSTRACT

The present invention relates to a laminated film roll body, around which a laminated film is wound, the laminated film including: a first polyimide film; and a second polyimide film laminated on the first polyimide film and made of a fluorine-based, siloxane-based, or amine-based polyamic acid, wherein the second polyimide film has a glass transition temperature of 350° C. or higher when measured by a temperature elevation rate of 20° C./min. The laminated film roll body can be used in a continuous manufacturing process of a flexible device to improve process yield and efficiency.

19 Claims, 3 Drawing Sheets

(51) Int. Cl.
  *C08G 73/10* (2006.01)
  *C08J 5/12* (2006.01)
  *B32B 37/02* (2006.01)
  *B32B 37/06* (2006.01)
  *B32B 37/10* (2006.01)
  *C08J 7/04* (2020.01)
  *C08J 5/18* (2006.01)

(52) U.S. Cl.
  CPC .............. *B32B 37/06* (2013.01); *B32B 37/10* (2013.01); *C08G 73/1067* (2013.01); *C08G 73/1071* (2013.01); *C08J 5/18* (2013.01); B32B 2255/10 (2013.01); B32B 2255/26 (2013.01); B32B 2379/08 (2013.01); B32B 2457/20 (2013.01); C08J 2379/08 (2013.01); C08J 2479/08 (2013.01)

(56) References Cited

U.S. PATENT DOCUMENTS

| | | | |
|---|---|---|---|
| 2014/0220330 A1* | 8/2014 | Park | C08G 73/10 428/220 |
| 2015/0017370 A1* | 1/2015 | Watanabe | B32B 17/10 428/41.8 |
| 2015/0183932 A1* | 7/2015 | Katayama | B32B 27/281 257/40 |
| 2015/0210048 A1* | 7/2015 | Jeong | H01L 31/02 428/212 |
| 2016/0032055 A1* | 2/2016 | Urakami | C08J 5/18 528/353 |
| 2016/0251545 A1 | 9/2016 | Yun et al. | |
| 2017/0096530 A1* | 4/2017 | Yun | C08G 73/106 |
| 2018/0297330 A1 | 10/2018 | Jeon et al. | |
| 2019/0062590 A1 | 2/2019 | Yun et al. | |

FOREIGN PATENT DOCUMENTS

| | | |
|---|---|---|
| CN | 106486497 A | 3/2017 |
| CN | 106553352 A | 4/2017 |
| EP | 3150655 A1 | 4/2017 |
| JP | 2010-094983 A | 4/2010 |
| JP | 2010-150379 A | 7/2010 |
| JP | 2011-056824 A | 3/2011 |
| JP | 2011-056825 A | 3/2011 |
| JP | 5254752 B2 | 8/2013 |
| JP | 2014-019108 A | 2/2014 |
| JP | 2014-166722 A | 9/2014 |
| JP | 5782924 B2 | 9/2015 |
| JP | 2016-531997 A | 10/2016 |
| JP | 2017-064709 A | 4/2017 |
| KR | 10-2013-0080433 A | 7/2013 |
| KR | 10-1299651 B1 | 8/2013 |
| KR | 10-2014-0040048 A | 4/2014 |
| KR | 10-2016-0062353 A | 6/2016 |
| KR | 10-2016-0097682 A | 8/2016 |
| KR | 10-1692648 B1 | 1/2017 |
| KR | 10-2017-0038718 A | 4/2017 |
| KR | 10-2017-0039900 A | 4/2017 |
| WO | 2011-122199 A1 | 10/2011 |
| WO | 2014-041816 A1 | 3/2014 |
| WO | 2015-198970 A1 | 12/2015 |

OTHER PUBLICATIONS

Office Action issued for Japanese Patent Application No. 2019-531370 dated Jul. 21, 2020, 4 pages.

Search Report issued for European Patent Application No. 18 805 339.1 dated Aug. 31, 2020, 9 pages.

* cited by examiner

[Fig. 1]
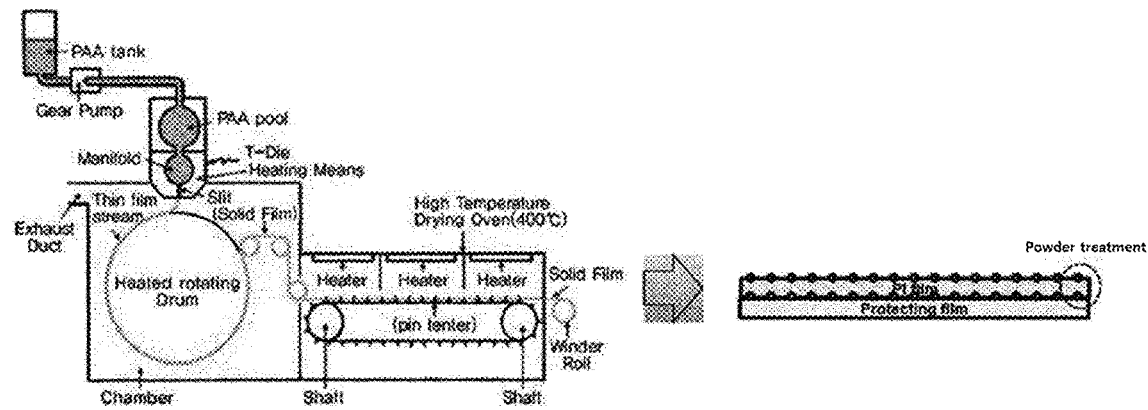
[Fig. 2]
(a)
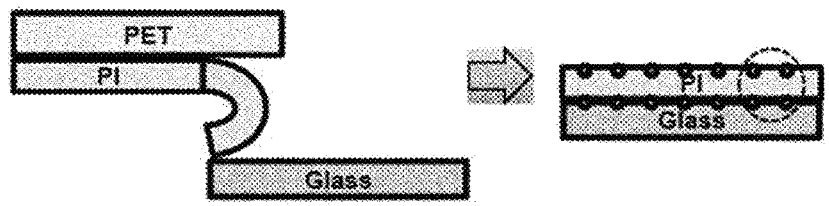
(b)

[Fig. 3]
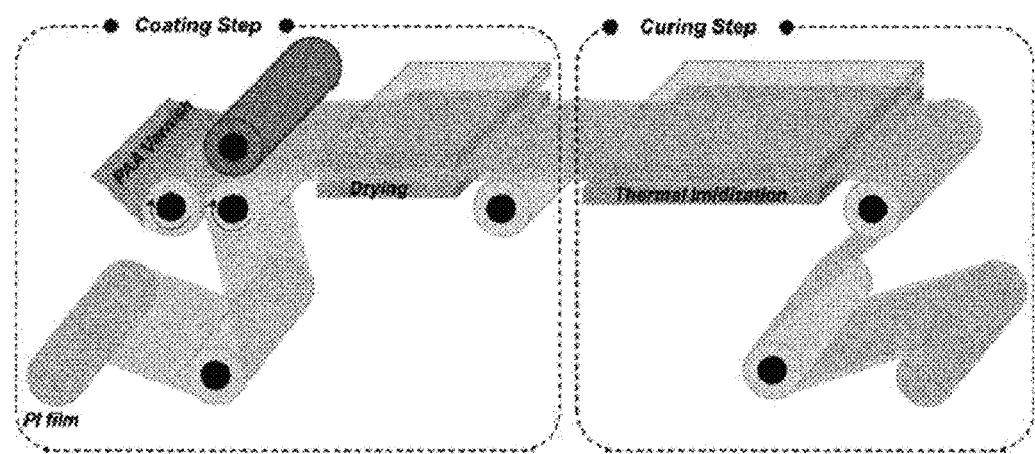
[Fig. 4]
(a) Hot pressing after delamination
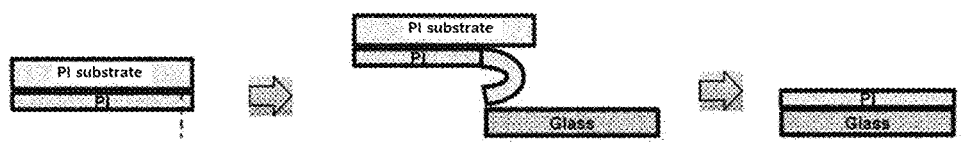
(b) Delamination after hot pressing
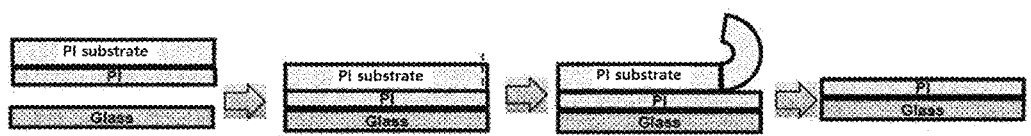

[Fig. 5]
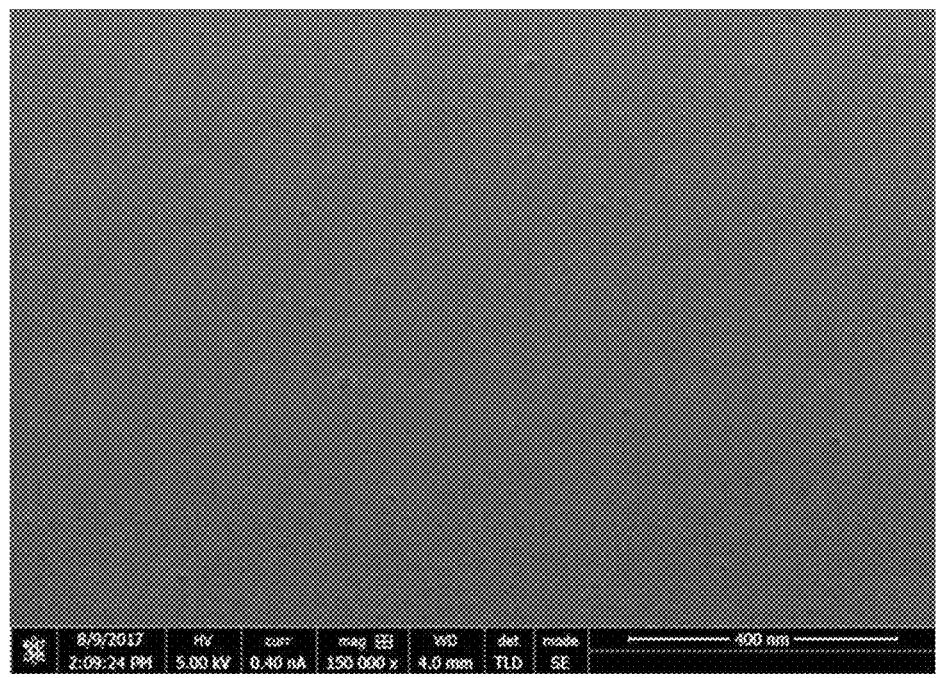

POLYIMIDE LAMINATED FILM ROLL BODY AND METHOD FOR MANUFACTURING SAME

This application is a 35 U.S.C. § 371 National Phase Entry Application from PCT/KR2018/003070, filed on Mar. 16, 2018, and designating the United States, which claims the benefit of priority to Korean Patent Application Nos. 10-2017-0064367, filed on May 24, 2017 and 10-2018-0020865, filed on Feb. 22, 2018, the entire disclosures of which are incorporated herein by reference.

BACKGROUND OF THE INVENTION

1. Field of the Invention

The present invention relates to a method for manufacturing a roll of a polyimide laminated film in which different kinds of polyimide films are laminated.

2. Description of the Related Art

Polyimide (PI) is a polymer having a relatively low crystallinity or mostly amorphous structure. It is easy to be synthesized and can be manufactured as a thin film. It is a polymer material having transparency, excellent heat resistance and chemical resistance owing to a rigid chain structure, excellent mechanical and electrical properties and dimensional stability, as well as the advantage of not requiring a crosslinking group for curing. It is widely used in electric and electronic materials such as automotive, aerospace, flexible circuit boards, liquid crystal alignment films for LCD, adhesives and coatings.

Particularly, the polyimide resin has excellent heat resistance and mechanical characteristics, so that it is used as a substrate for various display devices such as a liquid crystal display device and an organic EL display device, for example, a large display such as a television and a small display such as a mobile phone, a personal computer and a smart phone. For example, an organic EL display device can be manufactured by replacing an existing glass substrate with a polyimide substrate to form a thin film transistor (hereinafter referred to as TFT), and then sequentially laminating an electrode, a light emitting layer, and an electrode. By replacing a glass substrate with a polyimide substrate, it is possible to realize a flexible display together with a reduction in thickness and weight, thereby further broadening the use of the display device.

However, in the production process of the laminate including the polyimide substrate used in the flexible display, the polyimide substrate is prepared by a solvent casting method, which involves coating of a glass substrate with a polyamic acid solution that is a polyimide precursor solution and then curing of the substrate by stepwise heating. It results in problems of a long process time and low production yield.

SUMMARY OF THE INVENTION

A problem to be solved by the present invention is to provide a roll of a polyimide laminated film which can more efficiently provide a polyimide substrate for a flexible display having excellent physical properties.

Other problem to be solved by the present invention is to provide a method for manufacturing the roll of the polyimide laminated film.

Another problem to be solved by the present invention is to provide a method for manufacturing a laminate of a polyimide film and an inorganic substrate using the roll of the laminated film.

The present invention also provides a method of manufacturing a flexible device using the roll of the laminated film.

In order to solve the above-described technical problems, the present invention provides a roll in which a laminated film is wound comprising
a first polyimide film and
a second polyimide film laminated on the first polyimide film and made of a fluorine-based, siloxane-based or amine-based polyamic acid,
wherein the second polyimide film has a glass transition temperature of 350° C. or more as measured at a heating rate of 20° C./min.

According to one embodiment, the thickness of the first polyimide film may be 60 to 500 μm, and the thickness of the second polyimide film may be 0.1 to 50 μm.

According to one embodiment, the first polyimide film may be prepared by polymerizing a tetracarboxylic dianhydride having a structure represented by the following formula 1 or 3 and a diamine having a structure represented by formula 2 or 4.

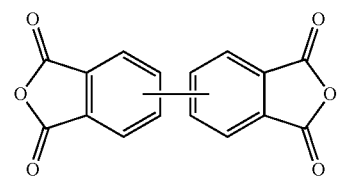

[Formula 1]

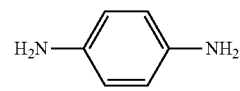

[Formula 2]

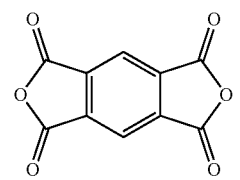

[Formula 3]

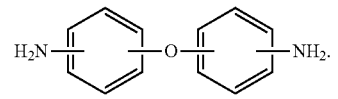

[Formula 4]

According to one embodiment, the first polyimide film has a thermal decomposition temperature of 450° C. or higher, a modulus of 9 to 11 GPa, a tensile strength of 400 to 600 MPa, a yield strength of 130 to 200 MPa, a coefficient of thermal expansion (CTE) of −20 ppm/° C. to 20 ppm/° C. in a temperature range of from 100° C. to 500° C.

According to one embodiment, the residual stress of the roll of the laminated film may be 0.1 MPa to 200 MPa.

According to one embodiment, in the case that the second polyimide film is prepared from a fluorine-based polyamic acid, it may be prepared from 4,4'-(hexafluoroisopropylidene)diphthalic acid anhydride and pyromellitic acid dianhydride as acid dianhydride and 2,2'-bis(trifluoromethyl)benzidine as diamine as a polymerization component.

According to one embodiment, in the case that the second polyimide film is prepared from a siloxane-based polyamic acid, it may be obtained by reacting (A) a component comprising at least one acyl compound selected from the group consisting of a tetracarboxylic dianhydride and a reactive derivative thereof with (B) a component comprising an imino-forming compound, and satisfies the following (i) and/or (ii):

(i) the component (A) comprises (A-1) an acyl compound having a structural unit represented by formula 7;

(ii) the component (B) comprises (B-1) an imino-forming compound having a structural unit represented by formula 7.

[Formula 7]

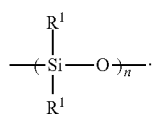

According to one embodiment, the polyamic acid for preparing the second polyimide film may have a silicone compound concentration of 3 to 50% by weight calculated by the following Equation 1.

Silicone compound concentration (wt %)=[Total weight of compounds having a structural unit represented by formula 7/(Total weight of acyl compounds+Total weight of imino-forming compounds)]×100   [Equation 1]

According to one embodiment, the content of (B-1) the imino-forming compound having the structural unit represented by the above formula 7 in the component (B) may be 5 to 70% by weight based on 100% by weight of the total amount of the component (B).

According to one embodiment, the number average molecular weight calculated from the amine value of (B-1) the imino-forming compound having the structural unit represented by the above formula 7 in the component (B) may be 500 to 10,000.

According to one embodiment, the polyamic acid is obtained by reacting the component (A) and the component (B) in a molar ratio (component (B)/component (A)) of from 0.8 to 1.2.

According to one embodiment, in the case that the second polyimide film is prepared from an amine-based polyamic acid, it may be prepared from at least one selected from 1R,2S,4S,5R-cyclohexanetetracarboxylic dianhydride, N,N'-bis(1,2-cyclohexanedicarboxylic anhydride-4-yl)carbonyl-3,3'-diaminodiphenylsulfone (PSHT), N,N'-bis(1,2-cyclohexanedicarboxylic anhydride-4-yl)carbonyl-1,4-phenylene diamine (PPHT), N,N'-1,4-phenylenebis[1,3-dihydro-1,3-dioxo-5-isobenzofurancarboxamide] (PPTA), N,N'-1,3-phenylenebis[1,3-dihydro-1,3-dioxo-5-isobenzofurancarboxamide] (MPTA), 3,3',4,4'-biphenyltetracarboxylic dianhydride (BPDA), pyromellitic dianhydride (PMDA), 4,4'-(hexafluoroisopropylidene)diphthalic anhydride (6FDA) and 4,4'-(fluorenyl)diphthalic anhydride (BPAF) as acid dianhydride, and at least one selected from N-(4-aminophenyl)-4-aminobenzamide (DABA), N,N-bis(4-aminophenyl)-terepthalamide (DATA), 4,4-bis(4-aminobenzamido)-3,3-trifuluoromethylbiphenyl (CF3DATA), 2,2'-bis(trifluoromethyl)benzidine (TFMB), 4,4-diaminodiphenylsulfone (4,4-DDS) and 3,4-diaminophenylsulfone (3,4-DDS) as diamine, as a polymerization component.

According to one embodiment, the second polyimide film may have a void having a diameter of 100 nm or less and a shape of the void is a sphere having an average diameter of 10 to 50 nm, when observing the cross section of the film.

According to one embodiment, the second polyimide film may have an in-plane retardation of 5 nm or less.

According to one embodiment, the second polyimide film may have a yellowness index (YI) of 50 or less when the thickness is 50 μm.

The present invention also provides a method for manufacturing a roll of laminated film, wherein the method comprises the steps of:

withdrawing a first polyimide film from a wound roll of the first polyimide film;

coating a fluorine-based, siloxane-based or amine-based polyamic acid solution on the withdrawn first polyimide film;

heating and curing the coated polyamic acid solution to form a second polyimide film on the first polyimide film; and winding the first polyimide film and the second polyimide film together without separating them to obtain a roll of a laminated film, wherein the first polyimide film is self-supporting which is not supported by a separate supporting substrate.

According to one embodiment, a tensile force of 0.1 to 200 MPa may be applied to the first polyimide film.

According to one embodiment, the polyamic acid solution may comprise at least 50% by weight of a solvent having a positive distribution coefficient (log P) as measured at 25° C., based on total weight of an organic solvent.

According to one embodiment, the heating and curing of the coated polyamic acid solution may be proceeded below the glass transition temperature of the second polyimide film in the range of 250 to 450° C. in a nitrogen atmosphere.

The present invention also provides a method of manufacturing a flexible device comprising the steps of:

forming a device on the second polyimide film of the polyimide laminated film supplied by withdrawing the above-mentioned roll of the laminated film; and delaminating the first polyimide film.

Effect of the Invention

The present invention relates to a roll manufactured by preparing a polyimide laminated film having a form in which a polyimide film formed by using a solution casting process and a high heat resistant polyimide film are stacked. The roll of the laminated film manufactured as described above can continuously supply a flexible substrate having excellent physical properties, thereby improving yield and efficiency of the continuous manufacturing process of the flexible device.

BRIEF DESCRIPTION OF THE DRAWINGS

FIG. 1 shows a process for producing a roll of a polyimide film according to a conventional method.

FIGS. 2a-b show a method of laminating a polyimide film produced by a conventional method on a glass substrate.

FIG. 3 shows a process for producing a roll of a laminated film according to the present invention.

FIGS. 4a-b show a method of laminating a laminated film supplied from a roll of the laminated film according to the present invention on a glass substrate.

FIG. 5 is a SEM image of the cross section of the second polyimide film produced in Example 4.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present disclosure, all the compounds or organic groups may be substituted or unsubstituted, unless otherwise specified. Herein, the term "substituted" means that at least one hydrogen contained in a compound or an organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

In the present disclosure, unless otherwise specified, the term "a combination thereof" means two or more functional groups are bonded to each other via a linkage such as a single bond, a double bond, a triple bond, an alkylene group having 1 to 10 carbon atoms (e.g., a methylene group ($-CH_2-$), an ethylene group ($-CH_2CH_2-$), etc.), a fluoroalkylene group having 1 to 10 carbon atoms (e.g., a fluoromethylene group ($-CF_2-$), a perfluoroethylene group ($-CF_2CF_2-$), etc.), a hetero atom such as N, O, P, S or Si, or a functional group containing the hetero atom (e.g., a heteroalkylene group containing a carbonyl group ($-C(=O)-$), an ether group ($-O-$), an ester group ($-COO-$), $-S-$, $-NH-$ or $-N=N-$, etc. in the molecule), or two or more functional groups are condensed and linked.

In the present disclosure, it will be understood that when a part such as a layer, a film, a substrate or the like is referred to as being "on" or "over" another part, it is for not only the case where the part is "directly on" another part, but also the case where additional other part is interposed therebetween. On the other hand, when a part such as a layer, a film, a substrate or the like is referred to as being "under" another part, it is for not only the case where the part is "directly under" another part, but also the case where additional other part is interposed therebetween.

In the conventional solvent casting method, a polyamic acid is coated on a glass substrate and cured by heating in an oven in a stepwise manner, which requires a long process time. Therefore, there is a problem of low production yield.

However, in the method of laminating the polyimide film on a carrier substrate, it enables to increase the production yield by shortening the processing time. However, there is a problem that it is difficult to wind the polyimide film produced due to static electricity in the conventional polyimide manufacturing process. Therefore, conventionally, a polyimide film was prepared by dispersing inorganic particles such as silica particles in a polyamic acid solution for anti-blocking as shown in FIG. 1. However, as shown in FIG. 2a, when a polyimide film containing such inorganic particles is laminated on a glass substrate by a hot pressing method, voids are formed on interface between the glass substrate and the film due to the inorganic particles present on the surface of the film, which reduces adhesive force between the glass substrate and the polyimide film. Therefore, the polyimide film may be raised up from the glass substrate during processes and a solution may be introduced into the interface of the polyimide film and the glass substrate during a cleaning process, so that the subsequent process may be difficult to proceed.

In addition, when a polyimide film is produced by a tenter process, a tensile force is applied only in the direction of progress. In this process, the polyimide film may have a difference in physical properties between MD (longitudinal direction) and TD (width direction), causing warpage of the substrate due to heat shrinkage during the subsequent process.

Further, a PET (polyethylene terephthalate) film is used as a protective film of the polyimide film for the substrate, and the heat resistance of the PET film is lower than that of the polyimide. Therefore, as shown in FIG. 2b, when used in a hot pressing process at a high temperature, shrinkage of the PET film may occur, which may cause warping of the substrate. In addition, in the case of the PET protective film, the adhesive strength to the polyimide film is increased by a hot pressing process, so that delamination may occur between the polyimide film and the inorganic substrate when the protective film is peeled off. Therefore, there are many problems when the PET protective film is used together with the polyimide film in a hot pressing process.

The present invention provides a roll of a laminated polyimide film and a method of manufacturing the same, which enable a flexible substrate to be continuously manufactured without using an anti-blocking agent such as inorganic particles or a PET protective film.

The present invention provides a roll in which a laminated film is wound comprising:
a first polyimide film and
a second polyimide film laminated on the first polyimide film and made of a fluorine-based, siloxane-based or amine-based polyamic acid,
wherein the second polyimide film has a glass transition temperature of 350° C. or more as measured at a heating rate of 20° C./min.

A roll of a laminated film in which a second polyimide film made of a fluorine-based, siloxane-based or amine-based polyamic acid and having a glass transition temperature of 350° C. or more as measured at a heating rate of 20° C./min is laminated on a first polyimide film used as a carrier film, can provide the polyimide film as a wound roll without using an antistatic additive such inorganic particles and can be conveniently used in a continuous manufacturing process of a flexible device since it does not require a PET protective film.

Further, the present invention provides a method for manufacturing the roll of the laminated film, wherein the method comprises the steps of:
withdrawing a first polyimide film from a wound roll of the first polyimide film;
coating a fluorine-based, siloxane-based or amine-based polyamic acid solution on the withdrawn first polyimide film;
heating and curing the coated polyamic acid solution to form a second polyimide film on the first polyimide film; and
winding the first polyimide film and the second polyimide film together without separating them to obtain a roll of a laminated film,
wherein the first polyimide film is self-supporting which is not supported by a separate supporting substrate.

In the present invention, a polyimide laminated film in which a polyimide film is formed on a polyimide substrate is prepared by a solution casting method using a polyamic acid with a self-supporting polyimide film as a substrate. This makes it possible to provide the polyimide film as a wound roll without using an antistatic additive such inorganic particles and therefore can be conveniently used in a continuous production process requiring a polyimide film.

According to one embodiment, the thickness of the first polyimide film may be 60 to 500 μm, preferably 60 to 300 μm. With this thickness, the polyimide film can be used alone as a supporting substrate without using a non-flexible supporting substrate such as a glass substrate in the process of manufacturing a polyimide using polyamic acid, so that it is possible to wind the polyimide substrate and the polyimide film formed on the substrate together. When the thickness of the first polyimide film is less than 60 μm, it may not be able to sufficiently fulfill its role as a substrate in the process of manufacturing a polyimide by the solution casting process, for example tearing or wrinkling may be occurred. When the thickness of the film is more than 500 μm, winding may become difficult.

Also, a predetermined tensile force may be applied to the film during the introduction of the first polyimide film into the manufacturing process, for example, a tensile force of 0.1 MPa or more and 200 MPa or less or 0.1 to 100 MPa may be applied. It provides tension to the film to keep the film firm and flat so that the second polyimide film formed on the first polyimide film can be formed more evenly.

According to one embodiment, the first polyimide film and the second polyimide film may exhibit an adhesive strength of about 1 N/cm or more, or about 2 N/cm or more, or about 3 to 5 N/cm, and a peel strength of 0.1 N/cm or less, or about 0.001 to 0.05 N/cm by a simple cutting process.

According to one embodiment, the first polyimide film may be a high heat-resistant polyimide film. For example, the first polyimide film may be prepared by polymerizing a tetracarboxylic dianhydride having a structure represented by the following formula 1 or 3 and a diamine having a structure represented by the following formula 2 or 4.

[Formula 1]
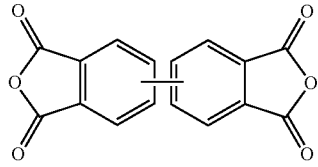

[Formula 2]
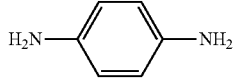

[Formula 3]
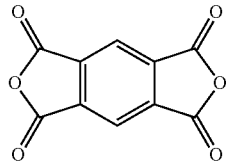

[Formula 4]
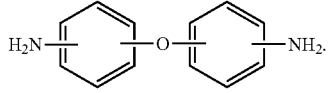

According to a preferred embodiment, the first polyimide film may be prepared by polymerizing the tetracarboxylic dianhydride of formula 1 and the diamine of formula 2, or the tetracarboxylic dianhydride of formula 3 and the diamine of formula 4.

The first polyimide film has a high decomposition temperature (Td) of 450° C. or more, or 450 to 600° C. As such, since the first polyimide film has excellent heat resistance, it is possible to suppress the occurrence of warpage or other problems causing a reduced reliability of the device against high-temperature heat added during a heating process for curing and imidization of the second polyimide film and a hot pressing process as a subsequent process. And as a result, it is possible to manufacture a device having improved characteristics and reliability.

According to one embodiment, the first polyimide film may have a coefficient of thermal expansion (CTE) of about 20 ppm/° C. or less, or about 17 ppm/° C. or less, or about −20 to 20 ppm/° C. in a temperature range of from 100° C. to 470° C. and a 1% thermal decomposition temperature (Td1%) of 450° C. or more, or 470° C. or more. According to one embodiment, the modulus of the first polyimide film may be 9 to 11 GPa. Further, the first polyimide film may have a tensile strength of 400 to 600 MPa and a yield strength of 130 to 200 MPa.

The first polyimide film satisfying the above requirements is cleanly peeled off from the second polyimide film used as a flexible substrate, so that it does not affect the transparency and optical characteristics of the second polyimide film.

According to one embodiment, the residual stress of the laminated roll may be 0.1 MPa to 100 MPa, preferably 0.1 to 10 MPa. Such a low residual stress can suppress the warpage phenomenon of the laminated substrate.

Meanwhile, the second polyimide film used in the laminated roll according to the present invention is made of a fluorine-based, siloxane-based or amine-based polyamic acid, and has a glass transition temperature of 350° C. or higher as measured at a heating rate of 20° C./min.

According to one embodiment, the diamine used in the preparation of the fluorine-based, siloxane-based or amine-based polyamic acid used in the production of the second polyimide film may be a diamine containing at least one divalent organic group selected from the following formulas 5a to 5t together with the fluorine-based, siloxane-based or amine-based diamine, but is not limited to thereto.

(5a)
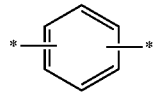

(5b)
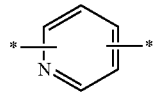

(5c)
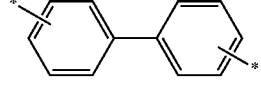

(5d)
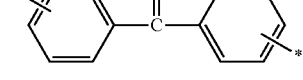

(5e)
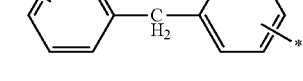

(5f)
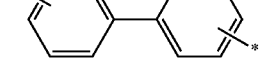

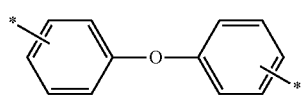 (5g)

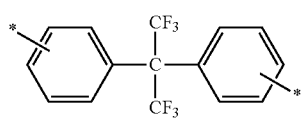 (5h)

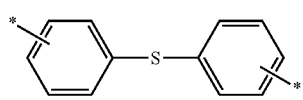 (5i)

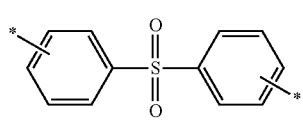 (5j)

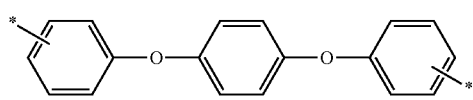 (5k)

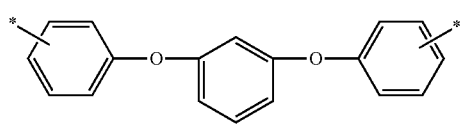 (5l)

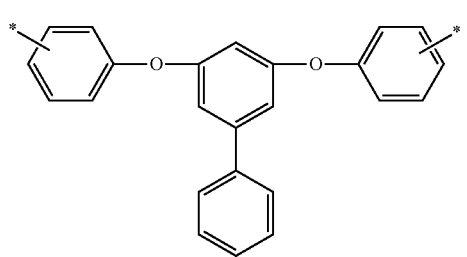 (5m)

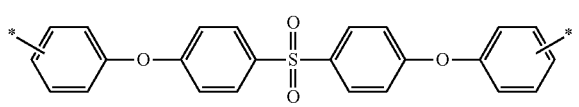 (5n)

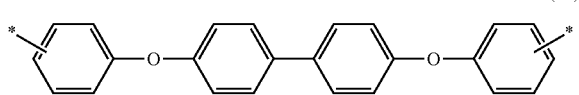 (5o)

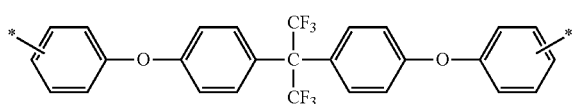 (5p)

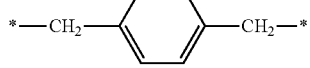 (5q)

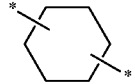 (5r)

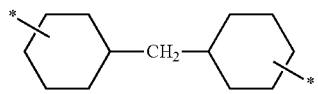 (5s)

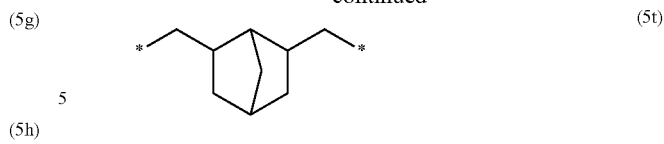 (5t)

At least one hydrogen atom present in the divalent organic group of formulas 5a to 5t may be substituted with a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

According to one embodiment, the tetracarboxylic dianhydride used in the preparation of the fluorine-based, siloxane-based or amine-based polyamic acid used in the production of the second polyimide film may be a tetracarboxylic dianhydride containing at least one tetravalent organic group selected from the following formulas 6a to 6r together with the fluorine-based, siloxane-based or amine-based tetracarboxylic dianhydride, but is not limited to thereto.

 (6a)

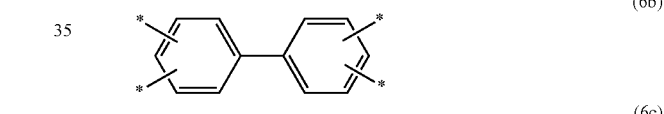 (6b)

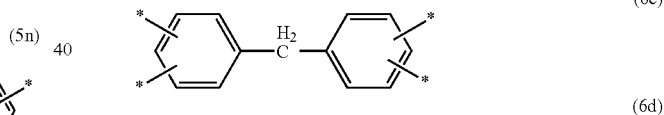 (6c)

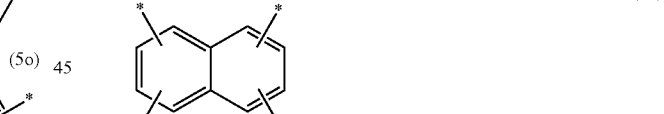 (6d)

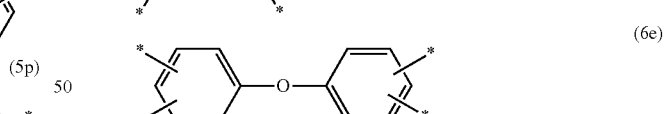 (6e)

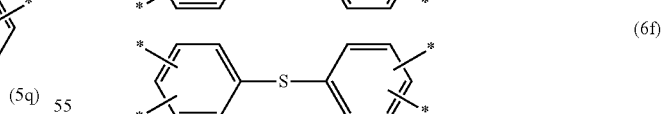 (6f)

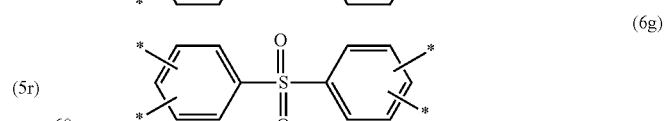 (6g)

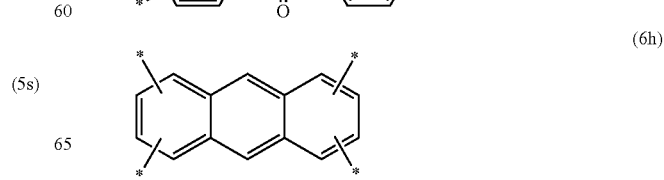 (6h)

cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

According to one embodiment, the second polyimide film produced by using the fluorine-based polyamic acid may be prepared by reacting 4,4'-(hexafluoroisopropylidene)diphthalic acid anhydride and pyromellitic acid dianhydride as acid dianhydride and 2,2'-bis(trifluoromethyl)benzidine as diamine as a polymerization component.

According to another embodiment, when the second polyimide film is prepared from the siloxane-based polyamic acid, it may contain a structural unit represented by the following formula 7 in the molecular structure.

[Formula 7]

$$\left[\begin{array}{c} R^1 \\ | \\ Si-O \\ | \\ R^1 \end{array}\right]_n$$

wherein $R^1$ is independently a monovalent organic group having 1 to 20 carbon atoms and n is an integer of 1 to 200.

The hydrocarbon group having 1 to 20 carbon atoms for $R^1$ includes an alkyl group having 1 to 20 carbon atoms, a cycloalkyl group having 3 to 20 carbon atoms, and an aryl group having 6 to 20 carbon atoms.

The alkyl group having 1 to 20 carbon atoms is preferably an alkyl group having 1 to 10 carbon atoms, and specific examples thereof includes a methyl group, an ethyl group, a propyl group, an isopropyl group, a butyl group, an isobutyl-group, a tert-butyl group, a pentyl group, a hexyl group, etc. The cycloalkyl group having 3 to 20 carbon atoms is preferably a cycloalkyl group having 3 to 10 carbon atoms, and specific examples thereof include a cyclopentyl group and a cyclohexyl group.

The aryl group having 6 to 20 carbon atoms is preferably an aryl group having 6 to 12 carbon atoms, and specific examples thereof include a phenyl group, a tolyl group and a naphthyl group.

Examples of the organic group having 1 to 20 carbon atoms containing an oxygen atom include an organic group containing a hydrogen atom, a carbon atom and an oxygen atom, and specific examples thereof include organic groups having 1 to 20 carbon atoms having an ether bond, a carbonyl group and an ester group.

Examples of the organic group having 1 to 20 carbon atoms having an ether bond include an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, an alkoxyalkyl group having 1 to 20 carbon atoms, and the like. Specific examples thereof include a methoxy group, an ethoxy group, a propoxy group, an isopropyloxy group, a butoxy group, a phenoxy group, a propenyloxy group, a cyclohexyloxy group and a methoxymethyl group.

Examples of the organic group having 1 to 20 carbon atoms having a carbonyl group include an acyl group having 2 to 20 carbon atoms. Specific examples thereof include an acetyl group, a propionyl group, an isopropionyl group, and a benzoyl group.

Examples of the organic group having 1 to 20 carbon atoms having an ester group include an acyloxy group having 2 to 20 carbon atoms. Specific examples thereof In formula 61, A may be selected from the group consisting of a single bond, —O—, —C(=O)—, —C(=O)NH—, —S—, —SO$_2$—, a phenylene group and a combination thereof and v is an integer of 0 or 1, and in formula 6r, x is an integer of 1 to 10.

In addition, at least one hydrogen atom present in the tetravalent organic group of formulas 6a to 6r may be substituted with a substituent selected from a halogen atom selected from —F, —Cl, —Br and —I, a hydroxyl group (—OH), a thiol group (—SH), a nitro group (—NO$_2$), a include an acetyloxy group, a propionyloxy group, an isopropionyloxy group and a benzoyloxy group.

Examples of the organic group having 1 to 20 carbon atoms containing a nitrogen atom include an organic group containing a hydrogen atom, a carbon atom and a nitrogen atom, and specific examples thereof include an imidazole group, a triazole group, a benzimidazole group and a benztriazole group.

Examples of the organic group having 1 to 20 carbon atoms containing an oxygen atom and a nitrogen atom include organic groups containing a hydrogen atom, a carbon atom, an oxygen atom and a nitrogen atom, and specific examples thereof include an oxazole group, an oxadiazole group, a benzoxazole group and a benzoxadiazole group.

It is preferable that at least one of the plurality of $R^1$ in formula 7 includes an aryl group in order to effectively avoid warping and twisting of the obtained polyimide-based film. More specifically, it is preferable that a plurality of $R^1$ are an alkyl group having 1 to 10 carbon atoms and an aryl group having 6 to 12 carbon atoms. In this case, a ratio of the number of moles of (i) the alkyl group having 1 to 10 carbon atoms and the number of moles of (ii) the aryl group having 6 to 12 carbon atoms among all $R^1$ in the structural unit represented by formula 7 (hereinafter also referred to as "structural unit (7)") (with that proviso that (i)+(ii)=100) is preferably (i):(ii)=90~10:10~90, more preferably (i):(ii) =85~15:15~85, and even more preferably (i):(ii)=85~65: 15~35. When the ratio of the alkyl group (i) to the aryl group (ii) in all $R^1$ in the structural unit (7) is within the above range, it is possible to more effectively avoid warping and twisting of the obtained polyimide-based film.

The alkyl group having 1 to 10 carbon atoms (i) is preferably a methyl group, and the aryl group having 6 to 12 carbon atoms (ii) is preferably a phenyl group. n in formula 7 is an integer of 1 to 200, preferably 3 to 200, more preferably 10 to 200, even more preferably 20 to 150, still more preferably 30 to 100, and particularly preferably 35 to 80. When n in formula 7 is within the above range, the polyimide obtained from the polyamic acid is likely to form a microphase separation, so that the occurrence of warping and twisting of the obtained polyimide-based film can be suppressed, and the whitening and the reduced mechanical strength of the polyimide-based film is suppressed.

The polyamic acid having a structural unit (7) is preferably obtained by reacting (A) a component comprising at least one acyl compound selected from the group consisting of a tetracarboxylic dianhydride and a reactive derivative thereof (also referred to as "component (A)") with (B) a component comprising an imino-forming compound (also referred to as "component (B)"). In this case, it is preferred that as the component (A), (A-1) an acyl compound having a structural unit (7) (hereinafter also referred to as compound (A-1)) is used, or as the component (B), (B-1) an imino-forming compound having a structural unit (7) (hereinafter also referred to as compound (B-1)) is used. Further, both the compound (A-1) and the compound (B-1) may be used. According to this reaction, it is possible to obtain a polyamic acid according to the structure of the starting compound to be used and to obtain a polyamic acid having a structural unit derived from the compound in an amount according to the amount of the starting compound to be used.

[Component (A)]

The component (A) comprises at least one acyl compound selected from a tetracarboxylic dianhydride and a reactive derivative thereof. Preferably, it comprises at least one compound selected from the group consisting of the compound (A-1), and an acyl compound (A-2) other than the compound (A-1). Specific examples of the compound (A-1) include at least one acyl compound selected from a tetracarboxylic dianhydride having a structural unit (7) and a reactive derivative thereof, preferably compounds represented by formulas 8, 8A, 8B and 8C. Examples of the reactive derivative include a tetracarboxylic acid having a structural unit (7), an ester of the tetracarboxylic acid, and an acid chloride of the tetracarboxylic acid.

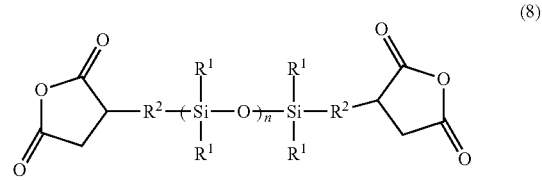

(8)

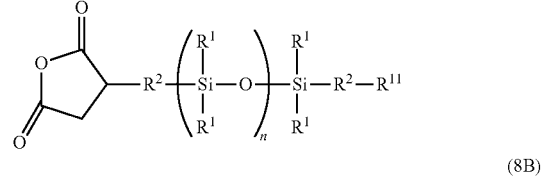

(8A)

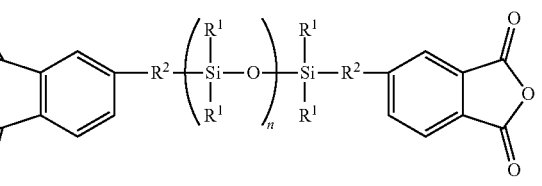

(8B)

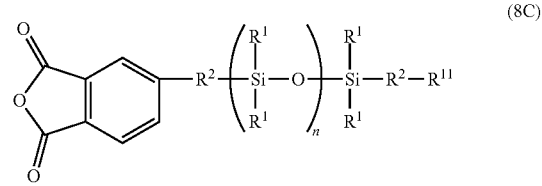

(8C)

In formulas 8, 8A, 8B and 8C, a plurality of $R^1$ and n are each independently the same as $R^1$ and n in formula 7, and the preference is also the same. $R^2$ each independently represents a divalent hydrocarbon group of 1 to 20 carbon atoms. In formulas 8A and 8C, $R^{11}$ each independently represents a hydrogen atom or a monovalent organic group having 1 to 20 carbon atoms, and the monovalent organic group having 1 to 20 carbon atoms includes a monovalent organic group having 1 to 20 carbon atoms for $R^1$ in formula 8.

The divalent hydrocarbon group having 1 to 20 carbon atoms for $R^2$ includes a methylene group, an alkylene group having 2 to 20 carbon atoms, a cycloalkylene group having 3 to 20 carbon atoms, and an arylene group having 6 to 20 carbon atoms. The alkylene group having 2 to 20 carbon atoms is preferably an alkylene group having 2 to 10 carbon atoms, and examples thereof include a dimethylene group, a trimethylene group, a tetramethylene group, a pentamethylene group and a hexamethylene group. The cycloalkylene group having 3 to 20 carbon atoms is preferably a cycloalkylene group having 3 to 10 carbon atoms, and examples thereof include a cyclobutylene group, a cyclopentylene group, a cyclohexylene group, and a cycloheptylene group. The arylene group having 6 to 20 carbon atoms is preferably an arylene group having 6 to 12 carbon atoms, and examples thereof include a phenylene group and a naphthylene group.

From the viewpoint of obtaining polyamic acid and/or polyimide having excellent heat resistance (high glass transition temperature) and excellent water resistance, the compound (A-1) preferably has a number average molecular weight of 200 to 10,000, more preferably 500 to 8,000. Specific examples of the compound (A-1) include DMS-Z21 (number average molecular weight: 600 to 800, n=4 to 7) manufactured by Gelest. In the synthesis of polyamic acid, these compounds (A-1) may be used singly or in combination of two or more.

When the component (A) comprises the compound (A-1), the component (A) preferably comprises the compound (A-1) in an amount of from 10 to 60 wt % based on 100 wt % of the total acyl compound (component (A)), more preferably from 20 to 50 wt %, even more preferably from 25 to 50 wt %, particularly preferably from 30 to 50 wt %.

From the viewpoint of obtaining a substrate (polyimide-based film) having excellent adhesion and detachability to a support, the amount of the compound (A-1) to be used is preferably within the above range. However, the preferable amount of the compound (A-1) based on 100% by weight of the total acyl compound (component (A)) is for the case where the compound (B-1) is not used in the synthesis of the polyamic acid. When the compound (A-1) and the compound (B-1) are used as the raw materials in the synthesis of the polyamic acid, it is preferable that the total amount of the compound (A-1) and the compound (B-1) to be used is substantially the same as the preferable amount of the compound (A-1).

When the compound (A-1) as the component (A) does not represent 100% by weight, components containing at least one tetravalent organic group selected from the above-mentioned formulas 6a to 6r may be used together.

[Component (B)]

Component (B) is an imino-forming compound. The term "imino-forming compound" as used herein refers to a compound which reacts with the component (A) to form an imino (group), and specific examples thereof include a diamine compound, a diisocyanate compound, a bis(trialkylsilyl)amino compound. The component (B) preferably includes at least one selected from the group consisting of the compound (B-1), and the imino-forming compound (B-2) other than the compound (B-1).

Examples of the imino-forming compound (B-1) having a structural unit (7) include compounds represented by the following formulas 9 and 9A.

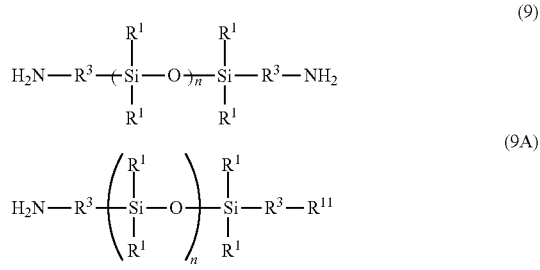

In formula 9, a plurality of $R^1$ and n are each independently the same as $R^1$ and n in formula 8, and the preference is also the same. In formula 9A, $R^{11}$ is the same as $R^{11}$ in formulas 8A and 8C. $R^3$ each independently represents a divalent hydrocarbon group of 1 to 20 carbon atoms, and examples of the divalent hydrocarbon group of 1 to 20 carbon atoms include a divalent hydrocarbon group of 1 to 20 carbon atoms for $R^2$ in formulas 8, 8A, 8B and 8C.

As the compound (B-1), a number average molecular weight calculated from the amine value is preferably 500 to 10,000, more preferably 1,000 to 9,000, and even more preferably 3,000 to 8,000, from the viewpoint of obtaining polyamic acid and/or polyimide having excellent heat resistance (high glass transition temperature) and excellent water resistance. Specific examples of the compound (B-1) include a dual-end type amino-modified methylphenyl silicone (X22-1660B-3 (number average molecular weight: 4,400, degree of polymerization n=41, phenyl group:methyl group=25:75 mol %) and X22-9409 (number average molecular weight: 1,300) manufactured by Shin-Etsu Chemical Co., Ltd.), a dual-end type amino-modified dimethyl silicone (X22-161A (number average molecular weight: 1,600, degree of polymerization n=20), X22-161B (number average molecular weight: 3,000, degree of polymerization n=39) and KF8012 (number average molecular weight: 4400, degree of polymerization n=58) manufactured by Shin-Etsu Chemical Co., Ltd. and BY16-835U (number average molecular weight: 900 degree of polymerization n=11) manufactured by Dow Corning Toray) and the like. In the synthesis of polyamic acid, the imino-forming compound (B-1) may be used singly or in combination of two or more. When the component (B) comprises the imino-forming compound (B-1) having a structural unit represented by formula 7, the component (B) preferably comprises the compound (B-1) in an amount of from 5 to 70 wt % based on 100 wt % of the total imino-forming compound (component (B)), more preferably from 10 to 60 wt %, even more preferably from 15 to 55 wt %. From the viewpoint of obtaining a polyimide-based film having excellent heat resistance and excellent adhesion and detachability to a substrate, the amount of the imino-forming compound (B-1) to be used is preferably within the above range.

However, the preferable amount of the compound (B-1) based on 100% by weight of the total imino-forming compound (compound (B)) is for the case where the compound (A-1) is not used in the synthesis of the polyamic acid.

When the compound (B-1) as the component (B) does not represent 100% by weight, components containing at least one tetravalent organic group selected from the above-mentioned formulas 6a to 6r may be used together.

The component (A) and the component (B) are preferably reacted in the range of the molar ratio of the component (A) and component (B) (component (B)/component (A)) of 0.8 to 1.2 as a use ratio (feed ratio), more preferably in the range of 0.95 to 1.0. When the molar ratio of the acyl compound (A) and the imino-forming compound (B) is less than 0.8 eq (equivalent) or more than 1.2 eq, the molecular weight is reduced, making it difficult to form a polyimide-based film.

However, the siloxane-based polyamic acid for forming the second polyimide film preferably has a silicone compound concentration of 3 to 50% calculated by the following Equation 1, more preferably 5 to 40%, and even more preferably 8 to 30%.

Concentration of silicone compound [unit:wt %]= (Weight of silicone compound)/{((A) Total weight of acyl compound)+((B) Total weight of imino-forming compound)}×100   [Equation 1]

Herein, the "weight of silicone compound" refers to the weight of all the compounds having the structural unit represented by the above formula 1.

The second polyimide film made of the siloxane-based polyamic acid may have a void having a diameter of 100 nm or less and a shape of the void may be a sphere having an average diameter of 10 to 50 nm, when observing the cross section of the film. Such a shape of void can serve as a sponge that can alleviate the warpage phenomenon of the substrate caused by the difference in CTE between the first polyimide film and the second polyimide film. Further, it is preferable that the in-plane retardation value of the second polyimide film is 5 nm or less, because if the thickness is 5 nm or more, the visibility to frontal reflection is affected by the reflection of light by an external light source.

According to another embodiment, when the second polyimide film is prepared from an amine-based polyamic acid, it has an amide bond in the molecular structure and the tetracarboxylic dianhydride and/or diamine as a raw material of polyamic acid may contain an amide bond. For example, it may be prepared from at least one selected from 1R,2S, 4S,5R-cyclohexanetetracarboxylic dianhydride, N,N'-bis(1, 2-cyclohexanedicarboxylic anhydride-4-yl)carbonyl-3,3'-diaminodiphenylsulfone (PSHT), N,N'-bis(1,2-cyclohexanedicarboxylic anhydride-4-yl)carbonyl-1,4-phenylene diamine (PPHT), N,N'-1,4-phenylenebis[1,3-dihydro-1,3-dioxo-5-isobenzofurancarboxamide] (PPTA), N,N'-1,3-phenylenebis[1,3-dihydro-1,3-dioxo-5-isobenzofurancarboxamide] (MPTA), 3,3',4,4'-biphenyltetracarboxylic dianhydride (BPDA), pyromellitic dianhydride (PMDA), 4,4'-(hexafluoroisopropylidene)diphthalic anhydride (6FDA) and 4,4'-(fluorenyl)diphthalic anhydride (BPAF) as acid dianhydride, and at least one selected from N-(4-aminophenyl)-4-aminobenzamide (DABA), N,N-bis (4-aminophenyl)-terepthalamide (DATA), 4,4-bis(4-aminobenzamido)-3,3-trifuluoromethylbiphenyl (CF3DATA), 2,2'-bis(trifluoromethyl)benzidine (TFMB), 4,4-diaminodiphenylsulfone (4,4-DDS) and 3,4-diaminophenylsulfone (3,4-DDS) as diamine, as a polymerization component.

The tetracarboxylic dianhydride and the diamine may react at a molar ratio of 1:0.8 to 1:1.2 or 1.1:1 to 1:1.1 in the preparation of the polyimic acid to be used for the production of the first polyimide film and the second polyimide film.

The weight average molecular weight (Mw) of the polyamic acid is preferably 10,000 to 1,000,000, more preferably 10,000 to 200,000, and still more preferably 20,000 to 150,000. The number average molecular weight (Mn) is preferably 5,000 to 10,000,000, more preferably 5,000 to 500,000, and particularly preferably 20,000 to 200,000. If the weight average molecular weight or the number average molecular weight of the polyamic acid is less than the above-described lower limit, the strength of the coating film may be lowered. In addition, the coefficient of linear expansion of the obtained polyimide-based film may rise more than necessary. On the other hand, if the weight average molecular weight or the number average molecular weight of the polyamic acid exceeds the upper limit, the viscosity of the composition for forming a polyimide-based film increases, and therefore the amount of the polyamic acid which is added to the composition when the composition is coated to form a coating film is reduced, so that the precision of the film thickness such as the flatness of the resulting coating film may be deteriorated.

The method of reacting the tetracarboxylic dianhydride with the diamine can be carried out according to the conventional polymerization method of polyamic acid such as solution polymerization. Specifically, it can be carried out by dissolving a diamine in an organic solvent, and then adding a tetracarboxylic dianhydride to the resultant mixed solution to effect polymerization reaction. The reaction can be carried out under an inert gas or a nitrogen stream and can be carried out under anhydrous conditions.

The polymerization reaction may be carried out at a temperature of −20 to 60° C., preferably 0 to 45° C. If the reaction temperature is too high, the reactivity may become high and the molecular weight may become large, and the viscosity of the polyimide precursor solution may increase, which may be disadvantageous in the process.

It is preferable that the polyimide precursor solution prepared according to the above-mentioned production method contains a solid content in such an amount that the solution has an appropriate viscosity in consideration of processability such as coatability and application properties. According to one embodiment, the content of the composition can be adjusted to 5 to 20 wt %, preferably 8 to 18 wt %, more preferably 8 to 12 wt % of the total content of polyimide precursor solution.

Alternatively, the polyimide precursor solution may be adjusted to have a viscosity of 2,000 cP or more, or 3,000 cP or more, and 10,000 cP or less, preferably 9,000 cP or less, more preferably 8,000 cP or less. When the viscosity of the polyimide precursor solution exceeds 10,000 cP, the efficiency of defoaming at the time of forming the polyimide layer is lowered, and thus the efficiency of the process may be lowered. In addition, the produced film may also have a deterioration in electrical, optical, and mechanical properties such as the lowered surface roughness due to bubble generation.

The organic solvent contained in the polyimide precursor solution of the present invention may be the same as the organic solvent used in the synthesis reaction.

Specifically, the organic solvent that can be used in the polymerization reaction may be selected from the group consisting of ketones such as γ-butyrolactone, 1,3-dimethylimidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N-methylpyrrolidone (NMP), N-ethylpyrrolidone (NEP), 1,3-dimethyl-2-imidazolinone, N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether and a mixture thereof.

Preferably, the organic solvent may be an organic solvent having a positive distribution coefficient (log P) as measured at 25° C. The organic solvent having a positive Log P is selected from N,N-diethylacetamide (DEAc), N,N-diethylformamide (DEF), N-ethylpyrrolidone (NEP), dimethylpropionamide.

(DMPA), diethylpropionamide (DEPA) or a mixture thereof may be used alone, or may be used in combination with a solvent having a negative Log P. Preferably, the amount of the solvent having a positive distribution coefficient (Log P) is at least 50% by weight or at least 70% by weight based on the total weight of the solvent.

Here, the distribution coefficient (Log P) is the ratio of concentrations in each solvent of a compound in a mixture of two immiscible phases (water and octanol) at equilibrium. The logarithm of the concentration ratio is thus log P.

$$\log P_{oct/wat} = \log\left(\frac{[solute]_{octanol}}{[solute]_{water}}\right)$$

For example, a distribution coefficient is predicted by summing up the degree to which a single atom constituting a molecule or a part of a molecule contributes to the Log P of a molecule. For example, it can be calculated using the ACD/Log P module of ACD/Percepta platform from ACD/Labs. The ACD/Log P module uses an algorithm based on QSPR (Quantitative Structure-Property Relationship) methodology using 2D molecular structures. The distribution coefficient (Log P value) of representative solvent at 25° C. is as follows.

TABLE 1

| | DEF | DMF | DEAc | DAMc | NMP | NEP | DMPA | DEPA |
|---|---|---|---|---|---|---|---|---|
| LogP (25° C.) | 0.05 | −1.01 | 0.32 | −0.75 | −0.28 | 0.22 | 0.25 | 1.28 |

The abbreviations in the above table 1 are as follows.
DMAc: N,N-dimethylacetamide
DEAc: N,N-diethylacetamide
DEF: N,N-diethylformamide
DMF: N,N-dimethylformamide
NMP: N-methylpyrrolidone
NEP: N-ethylpyrrolidone
DMPA: dimethylpropionamide
DEPA: diethylpropionamide According to another embodiment, the second polyimide film may have an in-plane retardation value ($R_{in}$) of about 5 nm or less, preferably 0.05 to 5 nm, and may maintain such a value after the hot pressing process.

According to one embodiment, the second polyimide film may be formed on the first polyimide film to a thickness of 0.1 to 50 μm, preferably 5 to 30 μm. The second polyimide film can be easily delaminated from the first polyimide film in the above-mentioned thickness range so that it can be utilized in the continuous manufacturing process of the substrate for a flexible device.

The second polyimide film may have a yellowness index (YI) of 50 or less when the thickness is 50 μm, 40 or less when the thickness is 40 μm, 30 or less when the thickness is 30 μm, 20 or less when the thickness is 20 μm, or 10 or less when the thickness is 10 μm. In the production of the polyimide laminated film according to the present invention, a predetermined tensile force may be applied to the first polyimide film. However, in the case of the second polyimide film formed on the first polyimide film by a solution casting method, a tensile force is not applied. Therefore, the second polyimide film has a small difference in mechanical strength between the longitudinal direction (MD) and the transverse direction (TD), so that a warpage phenomenon does not occur and an in-plane retardation value of the film can be small.

The polyimide precursor solution is applied to a substrate and heat-treated in an IR oven, in a hot air oven or on a hot plate. The heat treatment temperature may range from 300 to 450° C., preferably from 320 to 400° C. It may be performed in a multi-stage heating process within the above temperature range. The heat treatment process may be performed for 10 to 70 min, and preferably for 10 to 60 min.

According to one embodiment, the polyimide constituting the first polyimide film according to the present invention may not exhibit a glass transition temperature (Tg) in the heat treatment temperature range, that is, the curing temperature range of the polyimide. The first polyimide film preferably may have a thermal decomposition temperature of 400° C. or higher, more preferably 450° C. or higher.

According to one embodiment, the method for manufacturing the roll of the polyimide laminated film may be a roll-to-roll process. For example, the roll of the laminated film in which a polyimide substrate (first polyimide film) and a second polyimide film are combined in the manner shown in FIG. 3 can be produced. In this case, the first polyimide film used as the supporting substrate can also serve as a protective film of the second polyimide film, so that there is no need for a separate step of forming a protective film, and all the problems caused by using the PET protective film can be solved.

The second polyimide film from the roll of the polyimide laminated film produced by the above-described method can be continuously supplied and therefore the efficiency of the process when applied to the continuous production process of the device using the polyimide film can be improved.

The present invention provides a method of manufacturing a flexible device comprising the steps of forming a device on the surface of the second polyimide film of the polyimide laminated film produced by the above-described production method; and delaminating the first polyimide film after forming the device.

Examples of the device formed on the second polyimide film include light emitting devices such as organic electroluminescence (EL) devices and thin film transistor (TFT) devices, metal wirings, and modules such as semiconductor integrated circuits.

When a light emitting element such as an organic EL element and a TFT element is formed on a polyimide-based film, it can be used as a flexible display substrate or the like. Further, when a module such as a metal wiring or a semiconductor integrated circuit is formed, it can be used as a substrate for a flexible wiring.

As a method of forming the TFT device, a gate electrode is provided by, for example, etching a film of metal or metal oxide or the like by a sputtering method or the like. The temperature forming the film of metal or metal oxide by a sputtering method or the like can be appropriately selected depending on the composition for forming the polyimide-based film to be used, the support and the device to be formed, and is preferably 210 to 450° C., more preferably 220 to 370° C., and more preferably 230 to 350° C.

Next, a gate insulating film such as a silicon nitride film is formed on a polyimide-based film provided with the gate electrode, for example, by a plasma CVD method. Further, an active layer including an organic semiconductor or the like is formed on the gate insulating film by a plasma CVD or the like. The temperature forming a film such as a gate insulating film or an organic semiconductor by a plasma CVD method or the like can be appropriately selected depending on the composition for forming a polyimide-based film, the support, or the device to be formed, and is preferably 210° C. to 400° C., more preferably 220 to 370° C., and more preferably 230 to 350° C. Next, a film of metal or a metal oxide is formed on the active layer by a sputtering method or the like and then etched to provide a source electrode and a drain electrode. Finally, if necessary, a silicon nitride film or the like is formed by a plasma CVD method or the like to form a protective film. Accordingly, a thin film transistor device can be manufactured.

Although a bottom gate type thin film transistor device has been described above, the TFT device is not limited to this type, but may be a top gate type or the like.

The gate electrode, the source electrode, and the drain electrode are not particularly limited as long as they are formed of a conductive material. Examples of the conductive material include metals and metal oxides.

Examples of the metal include platinum, gold, silver, nickel, chromium, copper, iron, tin, antimony, tantalum, indium, aluminum, zinc, magnesium and alloys thereof. Examples of metal oxide include ITO, IZO, ZnO and $In_2O_3$. In addition, in consideration of adhesion with the polyimide-based film, a conductive polymer may be used as the conductive material.

Of these, use of a metal oxide is preferable because a transparent electrode can be formed.

As a method of forming the organic EL element, for example, an insulating layer, a first electrode, an organic semiconductor layer, a second electrode and a protective layer are sequentially formed from the side of the film surface on the polyimide-based film.

As a method for forming a metal wiring, a metal wiring can be provided by providing a copper layer on a polyimide-based film by, for example, a lamination method or a metallizing method, and treating the copper layer by a known method. In the case of lamination method, a copper layer can be provided by hot pressing a metal foil such as a copper foil on the film. In the case of the metalizing method, a seed layer containing a Ni-based metal and binding to the polyimide-based film is formed by, for example, a vapor deposition method or a sputtering method. A copper layer having a predetermined thickness can be formed by a wet plating method or the like. In the case of using the metalizing method, it is also possible to modify the surface of the polyimide-based film in advance in order to exhibit affinity with metals.

The second polyimide film produced by the method according to the present invention is excellent in heat resistance and excellent in adhesion with a support, so that it is possible to obtain a substrate having a wide range of applicable temperatures for forming a device on the film and having excellent performance.

According to another embodiment, the second polyimide film on which the device is formed may be laminated on the inorganic substrate, and then the first polyimide film may be delaminated.

According to one embodiment, as shown in FIG. 4a, the second polyimide film is cut from the polyimide laminated film to a predetermined size and then detached from the first polyimide film which is used as a base material, and forming a laminate with an inorganic substrate by hot pressing on the inorganic substrate.

Alternatively, as shown in FIG. 4b, the surface of the second polyimide film of the polyimide laminated film is contacted on an inorganic substrate and then hot pressed to laminate the polyimide laminated film on the inorganic substrate; the polyimide laminated film is cut to a predetermined size to reduce the adhesive strength between the first polyimide film and the second polyimide film; and the first polyimide film is separated from the second polyimide film.

In the actual manufacturing process, it is more efficient that a roll of a laminated film is directly introduced into a continuous process, followed by a hot pressing process, and then cut to a predetermined size to separate the first polyimide film from the second polyimide film adhered on the inorganic substrate.

The PET film used as a conventional protective film has low heat resistance. Therefore, when it is used as it is in a hot pressing process, warpage of the substrate can be caused by deformation such as shrinkage. In addition, the adhesion force of the protective film to the polyimide film is increased, so that the protective film is difficult to be delaminated, and the delamination may occur at the interface between the inorganic substrate and the polyimide film. In the present invention, since the polyimide film having high heat resistance is used as a protective film, there is little or no change in physical properties even in a hot pressing process at a high temperature. For example, the degree of warpage of the laminate after the hot pressing process may be 30° or less with respect to the end of the substrate, for example, the degree of warpage may be 0.1 to 15°. Herein, the degree of warpage refers to the degree of the angle of the substrate rising from both ends with respect to a horizontal line connecting the both ends of the substrate. It is possible to provide a more uniform and flat laminate owing to little warpage.

The step of cutting the polyimide laminated film may be performed by laser cutting or diamond scribing, but any method capable of cutting the film can be used without limitation.

The peel strength and adhesion force according to the present invention can be measured under the conditions shown in Table 2 below. In this disclosure, 'adhesion force' means the adhesive force of the first polyimide film to the second polyimide film before the cutting process, and 'peel strength' means the adhesion force of the first polyimide film to the second polyimide film after the cutting process.

TABLE 2

| Measurement condition for peel strength | Film width (mm) | 10 |
|---|---|---|
| | Film length (mm) | 100 |
| | Speed (mm/min) | 50 |
| | Measuring instrument | Texture Analyser (TA.XT plus, manufactured by Stable micro systems) |
| | Peel angle | 90 |

Specifically, the peel strength of the laminated film is obtained by preparing a sample of the laminate of the first and second polyimide films or a laminate of the polyimide laminated film laminated on a glass substrate, cutting the polyimide laminated film into a rectangular shape having a width of 10 mm, then measuring the force applied when the end portion of the cut first polyimide film is pulled off from the second polyimide film at an angle of 90° with the above-described measuring instrument and conditions.

The adhesive force before cutting was obtained by preparing a sample of the polyimide laminated film or a polyimide laminated film laminated on a glass substrate, attaching a tape having a width of 10 mm to the end portion of the first polyimide film of the sample, and pulling the end of the tape to measure the force applied when the first polyimide film is peeled off from the second polyimide film at an angle of 90°. At this time, the force measuring instrument and conditions may be the same as those of the measuring instrument and conditions for measuring the peel strength shown in Table 2.

The polyimide laminated film according to the present invention does not require a laser or light irradiation step or a dissolution step, does not require the use of a release agent for facilitating peeling and allows the first polyimide film to be easily peeled off from the second polyimide film only by a simple cutting process.

According to one embodiment, the hot pressing process may be performed at a nip pressure of 10 to 300 kN/m at a processing temperature of 400° C. to 500° C., but is not limited thereto. Herein, the nip pressure refers to the pressure that is applied to the side of the roll in contact with the substrate in the lamination process and it means the pressure per unit length of the roll, assuming that the surface on which the roll and the substrate come into contact is taken as a line.

According to one embodiment, when the first polyimide film is delaminated in a state where the first polyimide film is bonded after the hot pressing process, the peel strength of the first polyimide film and the second polyimide film is preferably equal to the peel strength before the hot pressing process, and may be, for example, about 0.3 N/cm or less, for example, about 0.2 N/cm or less, or about 0.1 N/cm or less, or about 0.001 to 0.05 N/cm.

According to one embodiment, the inorganic substrate may be a glass substrate, a metal substrate such as a stainless steel substrate, or a multi-layered structure of two or more layers. Of these, a glass substrate which can be most easily applied to a manufacturing process of a glass substrate is preferable.

Hereinafter, embodiments of the present invention will be described in detail so that those skilled in the art can easily carry out the present invention. The present invention may, however, be embodied in many different forms and should not be construed as limited to the embodiments set forth herein.

The abbreviations used in the following examples are as follows.
BPDA: 3,3',4,4'-biphenyltetracarboxylic dianhydride
PDA: phenylenediamine
6FDA: 4,4'-(hexafluoroisopropylidene)diphthalic anhydride
PMDA: pyromellitic dianhydride
TFMB: 2,2'-bis(trifluoromethyl)benzidine
ODA: oxydianiline
BPAF: 4,4'-(fluorenyl)diphthalic anhydride
PMDA-HS: 1R,2S,4S,5R-cyclohexanetetracarboxylic dianhydride
DABA: N-(4-aminophenyl)-4-aminobenzamide
DMAc: dimethylacetamide
DEAc: diethylacetamide
NMP: N-methylpyrrolidone Example 1

A composition comprising 20 wt % of a polyamic acid resin prepared by polymerizing 1 mol of BPDA and 0.99 mol of PDA, and 80 wt % of DMAc as a solvent was cast on a support. Then, the drying step at a temperature of 120° C. and the curing step (for 30 minutes) at a temperature of 150° C.-230° C.-300° C.-480° C. were successively carried out to prepare a roll of a first polyimide film having a width of 600 mm for use as a carrier substrate having a thickness of 60 microns.

On the other hand, a composition for forming a second polyimide film was prepared containing 10% by weight of a polyamic acid resin prepared by polymerizing 0.12 mol of 6FDA, 0.55 mol of PMDA and 0.66 mol of TFMB, and 90% by weight of DEAc as a solvent.

While the first polyimide film in roll form was withdrawn and conveyed at a speed of 0.5 m/min (the tensile force applied to the first polyimide film was 0.5 MPa), the composition for forming the second polyimide film was applied (cast) to have a thickness of 10 μm after drying. The drying step at 100° C. and the curing step at 400° C. for 30 min were successively carried out to form a second polyimide film on the first polyimide film. The laminate of the first and second polyimide films was wound at a winding speed of 0.1 m/min to obtain a roll of the polyimide laminated film.

Example 2

The second polyimide film side of the polyimide laminated film prepared in Example 1 was brought into contact with a glass substrate having a size of (370×470 mm), and then heated and pressed at a temperature of 350° C. at a pressure of 75 KN/m to laminate the polyimide laminated film on an inorganic substrate. The polyimide laminated film of the laminate was cut to such an extent that the first polyimide film was not cut off. The second polyimide film was delaminated from the first polyimide film to obtain a laminate in which the second polyimide film is laminated on the glass substrate.

Example 3

A roll of the polyimide laminated film and a laminate with an inorganic substrate were prepared in the same manner as in Examples 1 and 2 except that PMDA-ODA was used as the first polyimide film.

The physical properties of the film and the laminate are measured as follows.

Mechanical Properties

The mechanical properties (modulus, maximum stress, and maximum elongation) of the film were measured using UTM from Instron. Specifically, the film was cut to 5 mm×60 mm or more, and then the gap between the grips was set at 40 mm. While pulling the sample at a rate of 20 mm/min, tensile strength and other mechanical properties were examined (KS M ISO 527).

Retardation

The thickness retardation ($R_{th}$) and the in-plane retardation (Ro) were measured by Axoscan.

Coefficient of Thermal Expansion (CTE) and Glass Transition Temperature (Tg)

The coefficient of thermal expansion (CTE) and dimensional change of the film were measured using Q400 from TA instruments. A 15-micron thick film was prepared in a size of 5 mm×20 mm, and the sample was loaded using an accessory. A length of the actually measured film was equal to 16 mm. A pulling force was set at 0.02 N. A measurement starting temperature was 30° C. and the temperature was raised to 300° C. at a rate of 5° C./min, then lowered to 80° C. at a rate of −5° C./min, and again raised to 450° C. at a rate of 5° C./min. A coefficient of linear thermal expansion in the MD and TD directions of the polyimide-based film was determined as an average value in the range of 100 to 400° C. By observing the slope that changed before and after the glass transition temperature, the inflection point of the curve was defined as Tg as measured at a heating rate of 20° C./min.

Weight Average Molecular Weight

HLC-8020 type GPC apparatus manufactured by TOSOH was used for measurement. As a solvent, N-methyl-2-pyrrolidone (NMP) containing lithium bromide and phosphoric acid was used, and the molecular weight in terms of polystyrene was determined at a measurement temperature of 40° C.

Film Warpage

The polyimide-based film delaminated from the support was cut out to a size of 40×40 mm. A case where the warpage (The obtained polyimide-based film was placed on a horizontal substrate and the separation distance between the film and the substrate at the four corners of the film was measured. An average value of measurements was taken as the warpage.) is less than 1.0 mm is indicated by [⊚], a case where the warpage is 1.0 mm or more and less than 2.0 mm is indicated by [○], a case where the warpage is 2.0 mm or more and less than 3.0 mm is indicated by [Δ], and a case where the warpage is 3.0 mm or more is indicated by [X].

Comparative Example 1

A roll of the polyimide laminated film and a laminate with an inorganic substrate were prepared in the same manner as in Examples 1 and 2 except that 0.27 mol of 6FDA and 0.26 mol of TFMB were used for forming a first polyimide film.

Example 4 Preparation of Second Polyimide Film Using Siloxane-Based Polyamic Acid A roll of the polyimide laminated film and a laminate with an inorganic substrate were prepared in the same manner as in Example 1 except that a composition for forming a second polyimide film comprising 10 wt % of a polyamic acid resin prepared by polymerizing 0.0019 mol of a dual-end type amino-modified methylphenyl silicone (DMS-DPS, Shin-Etsu Chemical Co., Ltd., number average molecular weight: 5500), 0.0988 mol of TFMB, 0.05 mol of BPAF and 0.058 mol of PMDA and 90 wt % of DEAc as a solvent was used.

FIG. 5 is a SEM image of the cross section of the second polyimide film. According to FIG. 5, it can be seen that the void has a diameter of 100 nm or less and a spherical shape with an average diameter of 10 to 50 nm.

Example 5 Preparation of Second Polyimide Film Using an Amine-Based Polyamic Acid A roll of the polyimide laminated film and a laminate with an inorganic substrate were prepared in the same manner as in Example 1 except that a composition for forming a second polyimide film comprising 10 wt % of polyamic acid resin prepared by polymerizing 0.067 mol of PMDA-HS and 0.067 mol of DABA and 90 wt % of DEAc as a solvent was used.

Comparative Example 2

A roll of the polyimide laminated film and a laminate with an inorganic substrate were prepared in the same manner as in Example 1 except that a composition for forming a second polyimide film comprising 10 wt % of polyamic acid resin prepared by polymerizing 0.136 mol of BPDA and 0.134 mol of PDA and 90 wt % of DEAc as a solvent was used.

The results of measurement of 1% thermal decomposition temperature, modulus, tensile strength, yield strength and coefficient of thermal expansion of the first polyimide film prepared in Examples and Comparative Examples are shown in Table 3.

TABLE 3

| First polyimide film | Mw | 1% Thermal decomposition temperature (° C.) | Modulus (GPa) | Tensile strength (MPa) | Yield strength (MPa) | CTE (100-500° C.) (ppm/° C.) |
|---|---|---|---|---|---|---|
| Example 1 | 125,000 | 580 | 11 | 562 | 190 | 3 |
| Comp. Example 1 | 98,000 | 501 | 4.0 | 160 | 90 | 160 |

From the above results, it can be seen that the first polyimide film used in the production of the roll according to the Examples has excellent physical properties such as 1% thermal decomposition temperature, modulus, tensile strength, yield strength and coefficient of thermal expansion. Table 4 shows the results of measurement of glass transition temperature, in-plane retardation, residual stress of the laminate of the first polyimide film and the second polyimide film prepared in Examples and Comparative Examples.

TABLE 4

| Second polyimide film | Thickness (μm) | Mw | Glass transition temperature (° C.) | Void size (nm) | MD direction CTE(100-500° C.) (ppm/° C.) | TD direction CTE(100-500° C.) (ppm/° C.) | Residual stress of laminate (MPa) | YI | Degree of warpage |
|---|---|---|---|---|---|---|---|---|---|
| Example 1 | 10 | 112,000 | N.D. | - | 8 | 7 | 0.15 | 6.5 | 1.5° |
| Example 4 | 10 | 105,000 | 405 | 10~15 | 58 | 57 | 0.21 | 5.3 | 2.3° |
| Example 5 | 10 | 89,500 | 420 | - | 49 | 48 | 0.87 | 9.5 | 10.2° |
| Comp. Example 2 | 10 | 125,000 | Not measurable due to impossibility of film peeling | | | | | | |

The laminated films according to Comparative Examples 1 and 2 were not suitable for the continuous process due to generation of the curling phenomenon due to high residual stress after winding or the impossibility of film peeling. In contrary, the films according to Examples have a yellowness of 10 or less when the thickness is 10 μm, show almost no difference in CTE in the MD and TD directions, and have low residual stress and small warpage, and therefore they are suitable for continuous processing.

Example 6—Peel Strength According to Thickness

The laminated rolls were produced with varying the thicknesses of the first polyimide film and the second polyimide film. Table 5 shows the results of measuring the peel strength of the roll produced by the method according to Example 1. The measurement method is as described in Table 2.

TABLE 5

| Film thickness of second polyimide film | Film thickness of first polyimide film (μm) | | | | | |
|---|---|---|---|---|---|---|
| (μm) | 60 | 90 | 120 | 150 | 200 | 250 |
| 5 | 0.1N/cm | 0.05N/cm | 0.05N/cm | 0.05N/cm | 0.05N/cm | 0.05N/cm |
| 10 | 0.05N/cm | 0.05N/cm | 0.05N/cm | 0.05N/cm | 0.05N/cm | 0.05N/cm |
| 15 | 0.03N/cm | 0.02N/cm | 0.02N/cm | 0.05N/cm | 0.02N/cm | 0.02N/cm |
| 20 | 0.03N/cm | 0.02N/cm | 0.02N/cm | 0.05N/cm | 0.02N/cm | 0.02N/cm |
| 30 | 0.03N/cm | 0.02N/cm | 0.02N/cm | 0.05N/cm | 0.02N/cm | 0.02N/cm |
| 35 | 0.02N/cm | 0.02N/cm | 0.02N/cm | 0.02N/cm | 0.01N/cm | 0.01N/cm |
| 40 | 0.02N/cm | 0.01N/cm | 0.02N/cm | 0.02N/cm | 0.01N/cm | 0.01N/cm |
| 45 | 0.02N/cm | 0.01N/cm | 0.02N/cm | 0.02N/cm | 0.01N/cm | 0.01N/cm |
| 50 | 0.02N/cm | 0.01N/cm | 0.02N/cm | 0.02N/cm | 0.01N/cm | 0.01N/cm |

From the above results, according to the present invention, it is possible to manufacture a polyimide laminated film in which a polyimide film formed by using a solution casting process and a high heat-resistant polyimide film are stacked. The laminated film is wound to produce a roll without delamination process. It is possible to continuously produce a laminate in which the polyimide film is laminated on a glass substrate by using a hot pressing method, thereby improving yield and efficiency of the process.

While the present invention has been particularly shown and described with reference to specific embodiments thereof, it will be apparent to those skilled in the art that this specific descriptions is merely a preferred embodiment and that the scope of the invention is not limited thereby. It is therefore intended that the scope of the invention be defined by the claims appended hereto and their equivalents.

What is claimed is:

1. A roll of a laminated film in which the laminated film is wound, comprising
   a first polyimide film and
   a second polyimide film laminated on the first polyimide film and comprising a cured product of a fluorine-based, siloxane-based or amine-based polyamic acid,
   wherein the second polyimide film has a glass transition temperature of 350° C. or more as measured at a heating rate of 20° C./min,
   wherein the second polyimide film comprises a polymerization product of (A) a component comprising at least one acyl compound selected from the group consisting of a tetracarboxylic dianhydride and a reactive derivative thereof and (B) a component comprising an imino-forming compound,
   wherein, the component (A) comprises (A-1) an acyl compound having a structural unit represented by formula 7; and/or
   wherein, the component (B) comprises (B-1) an imino-forming compound having a structural unit represented by formula 7:

[Formula 7]

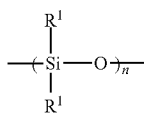

wherein $R^1$ is independently a monovalent organic group having 1 to 20 carbon atoms and n is an integer of 1 to 200, wherein the second polyimide film has a silicone compound concentration of 3 to 50% by weight calculated by the following Equation 1:

Silicone compound concentration (wt %)=[Total weight of compounds having a structural unit represented by formula 7/(Total weight of acyl compounds+Total weight of imino compounds)]×100   [Equation 1].

2. The roll of the laminated film according to claim 1, wherein the first polyimide film has a thickness of 60 to 500 μm, and the second polyimide film has a thickness of 0.1 to 50 μm.

3. The roll of the laminated film according to claim 1, wherein the first polyimide film comprises a polymerization product of a tetracarboxylic dianhydride having a structure represented by the following formula 1 or 3 and a diamine having a structure represented by formula 2 or 4

[Formula 1]

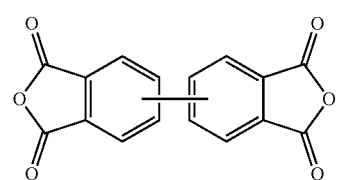

[Formula 2]

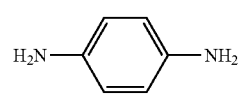

[Formula 3]

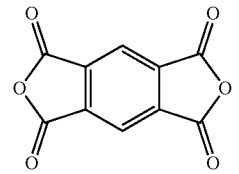

[Formula 4]

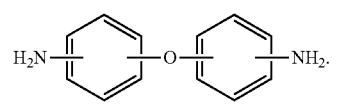

4. The roll of the laminated film according to claim 1, wherein the first polyimide film has a 1% thermal decomposition temperature of 450° C. or higher, a modulus of 9 to 11 GPa, a tensile strength of 400 to 600 MPa, a yield strength of 130 to 200 MPa, a coefficient of thermal expansion (CTE) of −20 ppm/° C. to 20 ppm/° C. in a temperature range of from 100° C. to 500° C.

5. The roll of the laminated film according to claim 1, wherein a residual stress of the roll of the laminated film is 0.1 MPa to 200 MPa.

6. The roll of the laminated film according to claim 1, wherein the second polyimide film comprises a polymerization product of 4,4'-(hexafluoroisopropylidene)diphthalic acid anhydride, pyromellitic acid dianhydride and 2,2'-bis(trifluoromethyl)benzidine.

7. The roll of the laminated film according to claim 1, wherein the content of (B-1) the imino-forming compound having the structural unit represented by formula 7 in the component (B) is 5 to 70% by weight based on 100% by weight of the total amount of the component (B).

8. The roll of the laminated film according to claim 1, wherein the number average molecular weight calculated from the amine value of (B-1) the imino-forming compound having the structural unit represented by formula 7 in the component (B) is 500 to 10,000.

9. The roll of the laminated film according to claim 1, wherein the polyamic acid is a reaction product of the component (A) and the component (B) in a molar ratio (component (B)/component (A)) of from 0.8 to 1.2.

10. The roll of the laminated film according to claim 1, wherein the second polyimide film comprises a polymerization product of at least one acid anhydride selected from N,N'-bis(1,2-cyclohexanedicarboxylic anhydride-4-yl)carbonyl-3,3'-diaminodiphenylsulfone (PSHT), N,N'-bis(1,2-cyclohexanedicarboxylic anhydride-4-yl)carbonyl-1,4-phenylene diamine (PPHT), N,N'-1,4-phenylenebis[1,3-dihydro-1,3-dioxo-5-isobenzofurancarboxamide] (PPTA), N,N'-1,3-phenylenebis[1,3-dihydro-1,3-dioxo-5-isobenzofurancarboxamide] (MPTA), 3,3',4,4'-biphenyltetracarboxylic dianhydride (BPDA), pyromellitic dianhydride (PMDA), 4,4'-(hexafluoroisopropylidene)diphthalic anhydride (6FDA) and 4,4'-(fluorenyl)diphthalic anhydride (BPAF); and
at least one diamine selected from N-(4-aminophenyl)-4-aminobenzamide (DABA), N,N-bis(4-aminophenyl)-terepthalamide (DATA), 4,4-bis(4-aminobenzamido)-3,3-trifuluoromethylbiphenyl (CF3DATA), 2,2'-bis(trifluoromethyl)benzidine (TFMB), 4,4-diaminodiphenylsulfone (4,4-DDS) and 3,4-diaminophenylsulfone (3,4-DDS).

11. The roll of the laminated film according to claim 1, wherein the second polyimide film has a void having a diameter of 100 nm or less.

12. The roll of the laminated film according to claim 1, wherein the second polyimide film has an in-plane retardation of 5 nm or less.

13. The roll of the laminated film according to claim 1, wherein the second polyimide film has a yellowness index (YI) of 50 or less when the thickness is 50 μm.

14. The roll of the laminated film according to claim 11, wherein the void has a shape of a sphere having an average diameter of 10 to 50 nm.

15. A method for manufacturing the roll of the laminated film according to claim 1, wherein the method comprises the steps of:
unwinding a first polyimide film from a wound roll of the first polyimide film;
coating a fluorine-based, siloxane-based or amine-based polyamic acid solution on the unwound first polyimide film;
heating and curing the coated polyamic acid solution to form a second polyimide film on the first polyimide film; and
winding the first polyimide film and the second polyimide film together without separating them to obtain the roll of the laminated film,
wherein the first polyimide film is not supported by a separate supporting substrate.

16. The method for manufacturing the roll of the laminated film according to claim 15, wherein a tensile force of 0.1 to 200 MPa is applied to the first polyimide film.

17. The method for manufacturing the roll of the laminated film according to claim 15, wherein the polyamic acid solution comprises at least 50% by weight of a solvent having a positive distribution coefficient (log P) as measured at 25° C., based on total weight of an organic solvent.

18. The method for manufacturing the roll of the laminated film according to claim 15, wherein the heating and curing of the coated polyamic acid solution is proceeded below the glass transition temperature of the second polyimide film in the range of 250 to 450° C. in a nitrogen atmosphere.

19. A method of manufacturing a flexible device comprising the steps of:
unwinding the roll of a laminated film according to claim 1,
forming a device on the second polyimide film of the unwound laminated film; and
delaminating the first polyimide film after forming the device.

* * * * *